Feb. 23, 1932.  J. McMULLEN  1,846,889
SHIPPING AUTOMOBILES
Filed March 5, 1930  2 Sheets-Sheet 1

Feb. 23, 1932.  J. McMULLEN  1,846,889
SHIPPING AUTOMOBILES
Filed March 5, 1930   2 Sheets-Sheet 2

INVENTOR
John McMullen
BY
Fred W. Tasker
ATTORNEY

Patented Feb. 23, 1932

1,846,889

UNITED STATES PATENT OFFICE

JOHN McMULLEN, OF BUFFALO, NEW YORK

SHIPPING AUTOMOBILES

Application filed March 5, 1930. Serial No. 433,198.

My invention refers to means for securing automobiles in a relatively stationary position in the freight cars in which they are shipped, a principal object being to provide securing means of such a nature that the automobiles may be anchored firmly without any damage to the car construction, particularly the floor of the car, the fastening means being quickly and easily applied or released, and consisting of few and simple parts.

In some of the well known methods of loading, owing to the length of the completely assembled automobiles as they are generally shipped, the practice obtains to mount some of the automobiles in an inclined or half decked position, as this gives more room and allows another car to stand on all its four wheels and with the engine hood extending under the half decked automobiles. In this case a horse or frame is required to uphold the lifted front end of the automobile and sustain the latter in its inclined position. Such frame is often rather complex, is mounted on the car floor, and is often composed of a temporary structure that is not re-used but is ripped out and discarded at the end of a trip. One of my purposes herein is to provide in lieu of the same a simple permanent mechanism arranged on the side and roof of the car, and operated as required from an active to an inactive position and the reverse, with little labor and no loss of material or damage to the car.

The railway freight cars to which the invention is adaptable are of various kinds, as flat cars, gondola cars, or box cars, but preferably and usually the latter. In a review of inventions and mechanisms in the class of automobile anchoring devices it will be found that manifold devices, often elaborate and costly, have been used for supporting the automobiles during shipment in such a manner that they may be firmly held and prevented from movement either longitudinally or laterally with respect to the car; but such devices usually involve the bolting, spiking or nailing of various clamps to the floor or sides of the car, all of which have to be forcibly dislodged after use, usually tearing the floor and damaging the box car, so as to cause a large repair expense. My invention aims to avoid this expense, and consists essentially in permanent means on the car itself for upholding the front end of the half decked automobile, said means comprising a few easily operated parts which may be used for a long time without injury to the box car or the automobile.

With the suggested and other objects in view, my invention consists further in the novel combination, construction and arrangement of parts, hereinafter described, illustrated in the accompanying drawings and pointed out in the claims hereto appended, it being understood that various changes in the form, proportion, size and minor details of construction within the scope of the claims, may be resorted to without departing from the spirit or sacrificing the advantages of the invention.

To more fully disclose my improvements, reference is made to the annexed drawings, in which.

Similar characters of reference denote like parts throughout all the different figures of the drawings.

Figure 1:
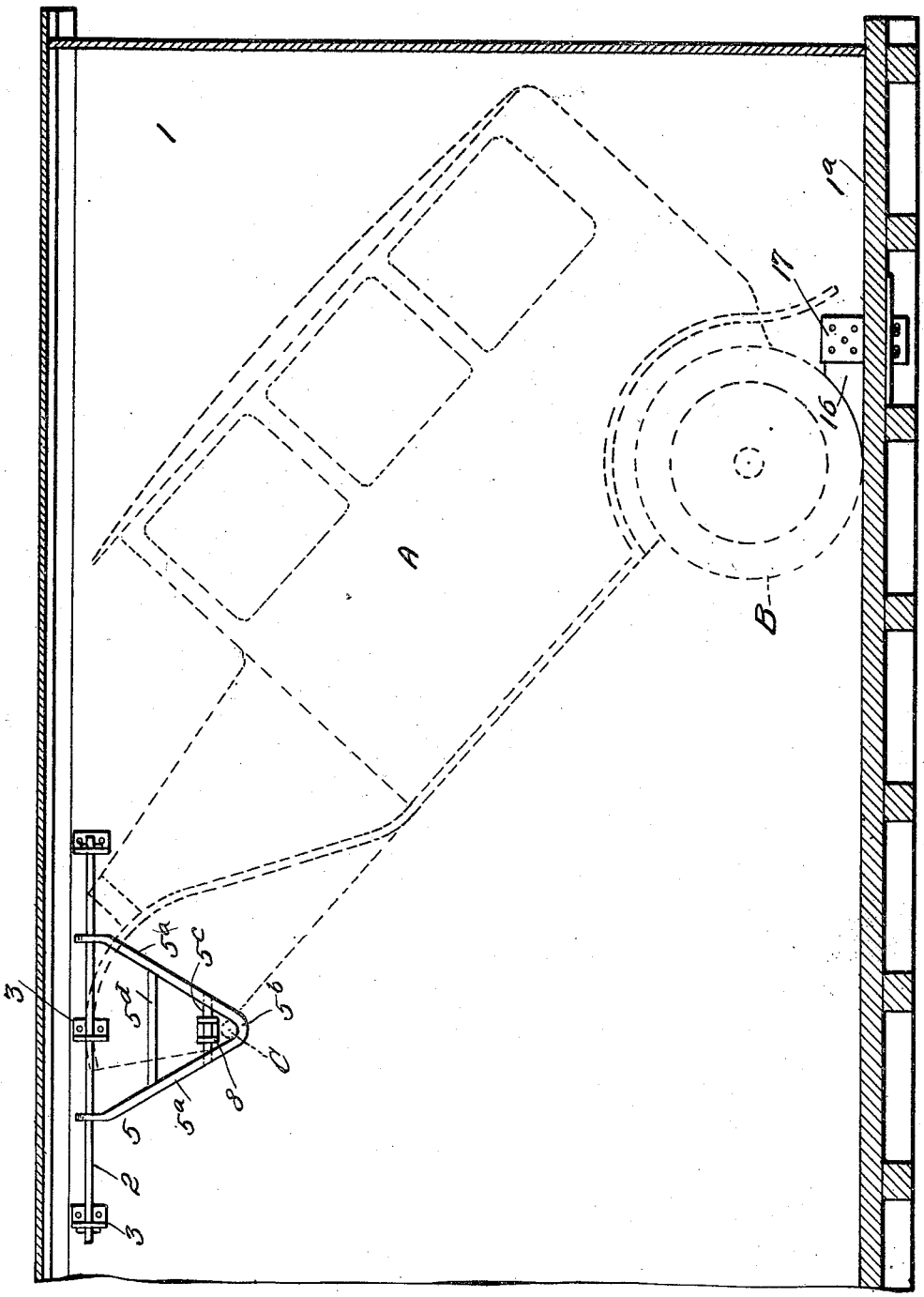
Figure 1 is a longitudinal section through a portion of the interior of a box car, illustrating my improved means for supporting the front end of a half-decked automobile without damage to the car floor or other structure.

In the one form or method of loading, and in the simple kind of suggested box car, which I have illustrated for explanatory purposes only and with no intention of being confined thereto, 1 denotes the half portion or so of a box car, having a floor 1a, and A the dotted outline of an automobile mounted in an inclined or half deck position and held there by the mechanism which constitutes the subject matter of the present invention and is permanently carried on the side wall of the box car 1 near the roof of the same.

The automobile A is placed with its rear wheels B on the floor 1a, where they are held by chock blocks 16 that are kept in place by clamps 17. The automobile A is in a half deck position, its front wheels being removed, and its front axle bar C provided with pivoted axle spindles 6, 6, which preferably carry wooden blocks 7. The half decked automobile allows the placing of the front hood of another automobile under it, whereby space is economized.

When the front end of an automobile, as A, is raised to occupy a half decked position, it is generally essential to have a strong frame or horse to hold it up. Temporary wooden V-horses are often employed and discarded after using. But I prefer a permanent mechanism, as cheaper, easier to place and replace, and preventing damage to the car construction.

The end portions 6 of the front axle C are supported in an elevated position above the floor 1a of car 1, (after the automobile has been placed in the inclined position) by means of V-shaped supports 5, consisting of strong metallic castings or rods bent into the V-shape to provide the side portions 5a and the apex 5b, the apex member being bent down to an obtuse angle to the side members 5a, so that when the members 5a are in an inclined and operative position the members 5b may be vertical so that the axles 6 may rest therein, as in loops, thus enabling the front end of the automobile to be held in its elevated position. The side rods 5a of the V-shape are connected by a longer intermediate rod 5d, and a shorter cross-piece 5c, to obtain stiffness and strength for the entire support, these pieces 5c and 5d being integral with the sides 5a. The ends of the sides 5a are perforated with openings to receive the horizontal guide rods 2, which are of greater or less length and are secured to the sides of the car 1 at points opposite to the elevated front end of auto A. These guide rods 2 may be supported in many different ways, but I find it convenient to employ perforated brackets 3, projecting from the walls of the car 1 to which they are bolted or nailed and holding the rods 2 at a short distance from the sides of the car. The skeleton supports 5, whose perforated sides 5a receive the rods 2 through their perforations, are therefore horizontally adjustable on rods 2, so that they may be properly localized with reference to the axle spindles 6 and receive the latter in the apex loops 5b, said supports being capable of being partly rotated on the rods 2 in a vertical plane.

Figure 2:
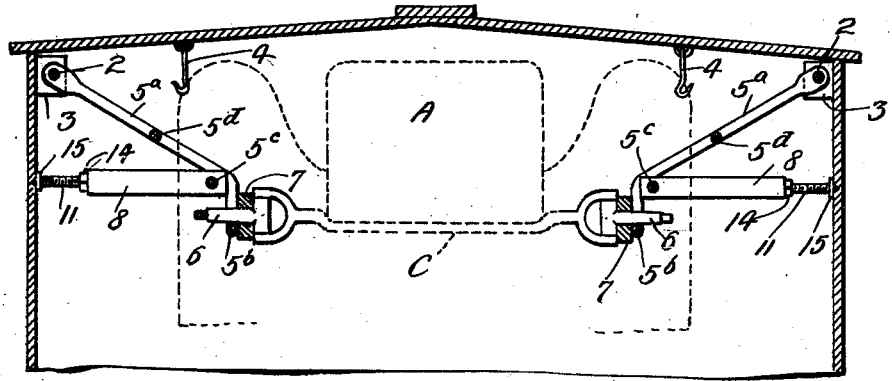
Figure 2 is a partial transverse sectional view of the same, with the car holding mechanism in front elevation and in the position that the parts assume when interlocked with the automobile (shown in dotted lines) to rigidly hold the same against swaying or other movement.
Figure 4:
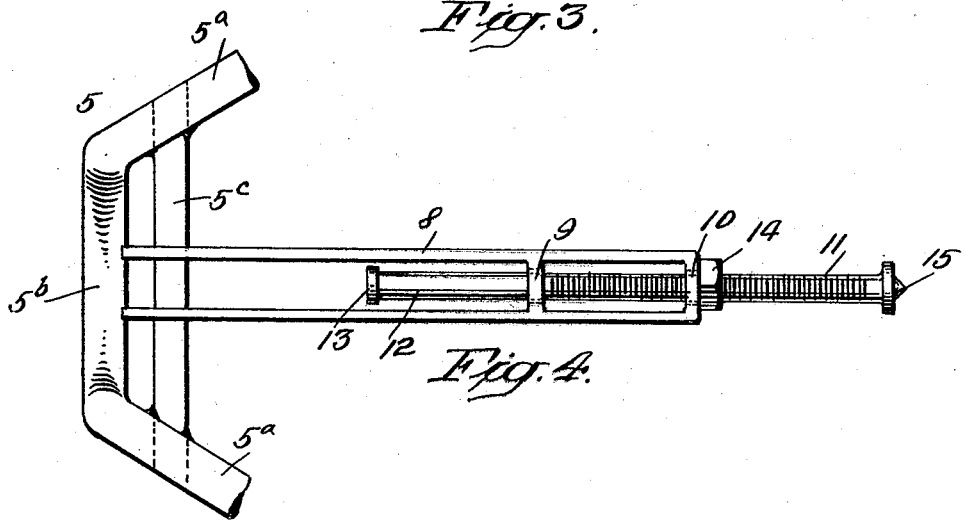
Figure 4 is an enlarged detail plan view of a part of the holding mechanism for one side of the car, being that used for upholding one end of the front axle, the mechanism on the other side of the car being a duplicate.

In addition to the horizontal skeleton supports 5 that engage and uphold the front axle or some other front part of the car, it is necessary to provide means to lock and brace the said frames in their active supporting position as they are shown in Figures 1 and 2. Such locking bracing contrivance holds the ends 5b of the supporting V-frames pressed against the wooden blocks 7 after the spindles 6 have been enclosed in the apex loops 5b, as seen in Figure 2; and the said locking means comprises a skeleton oblong frame 8 having two parallel bars that are perforated near one end so as to be hung movably on the rod connection 5c that unites the sides 5a of support 5 near the loop 5b. See Figure 4. Also the frame 8 near its opposite end has its parallel bars united by integral transverse blocks 9 and 10 that are bored through with smooth passages to receive a screw-threaded rod 11.

Said rod 11 lies loosely in the bored bearing members 9 and 10 through which it travels as in guides without further engaging said parts, and the rod 11 lies also between the parallel bars of the frame 8, its inner end being smooth at 12 and having a collar 13 which strikes against the bearing member 9 when the screw 11 moves out far enough and thus is prevented from being disconnected from bar 8.

The screw 11 extends some little distance beyond the member 10 and carries thereon a nut 14, which is capable of being adjusted on the screw and brought tightly up against the end portion 10 of frame 8, the extreme outer end of screw 11 having a collar or head 15 thereon with a pointed center. Thus the screw 11 constitutes an extension of frame 8, and both together form a locking brace hung pivotally on the skeleton frame 5 and is adapted after the said frame 5 receives a spindle 6 and is pressed tightly against block 7, to be raised into a horizontal position, so as to brace against the end 5b that holds the axle, the other end of this brace being placed against the side wall of the car, so that said wall is engaged by the pointed end 15; and when the brace is lengthened to the proper length by adjusting screw 11, or slipping it through the loose bearings 9 and 10 until the brace makes a close fit against the side of the car and between the latter and a part of frame 5, then the nut 14 can be tightened in its position against bearing 10 and the brace will maintain this position and lock the automobile in its decked position until the nut 14 is loosened and the mechanism released, so that the auto may be removed from the freight car.

The auto supports of this character on the inner opposite side of the car are adapted to be locked and unlocked at will, and they constitute a permanent part of the car equipment and are easily manipulated in loading or unloading, whatever may be the method of loading or the kind of freight; and no damage accrues to the car from nailing or spiking temporary dunnage therein, but the load is easily stored or removed. When the car is empty the locking brace 8 can be folded up against the skeleton frame 5 and the two jointly lifted up against the roof of the car and held there by suitable means, as a hook 4 depending from the ceiling of the car and engaging the brace frame 8, while frame 5 rests on the folded brace 8, see Figure 2.

Figure 3:
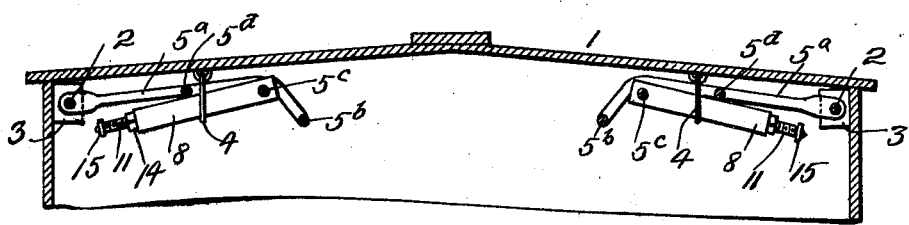
Figure 3 is a similar view showing the holding mechanism released from the automobile and with its parts folded together and hung on the ceiling of the car in an idle and inactive position.

Therefore it will be seen how these simple contrivances adjustably carried on the car frame may be moved into active position from the idle position shown in Figure 3 and caused to hold up the auto as shown in Figure 1.

Suppose that the supports are folded and hung up in the roof out of the way as shown in Figure 3. Then after the box car is loaded with an automobile, as A, to be shipped, this motor car will be lifted at the front into the inclined position. Then the supports will be disengaged by the attendants, one on each side, by unhooking them from their roof position and lowered to permit the ends 6 of the front axle to be placed in the vertical loop members 5b of skeleton supports 5. The members 5b will have to be dropped low enough to receive axles 6, after which they can be lifted against the blocks 7, with the apex of the members 5b closely receiving the axles 6. Next the braces 8 will be brought down into a horizontal position by rotating them slightly on their pivot rods 5c, after which the screw rod 11 will be thrust out until its end 15 strikes against the side of car 1 and the sharp head 15 embeds itself in the wall of the car. If now the nut 14 is tightened against bearing 10 the whole brace will be maintained in its full position occasioned by drawing out the screw 11 to the desired distance, and the braces will hold the supports 5 in the position shown in Figure 2, where they effectually function to uphold the car. When the car is to be released the nuts 14 may be loosened and the braces disengaged so that supports 5 can be released from the car axle and the car lowered into a horizontal position.

Many changes may be made in the form, shape, size, and relative arrangement of the parts. The skeleton forms of the supports and braces may be made more or less solid, or changed in kind without altering their function. And many details may be modified and combined differently within the scope of the ensuing claims.

What I claim, is:

1. Means for holding uplifted the front end of a half decked vehicle in a box car, which consists in a V-shaped skeleton support, a rigid rail on the side of the car on which the support is hung so as to be horizontally adjustable and capable of rotating in a vertical plane, the inner end of said support being formed as a loop to engage the front axle of the automobile, and a brace for the support having two members, one of which is pivoted to said support, while the other has a screw and is carried in the first member, together with a lock nut on said screw, and pointed means on the outer end of the screw member.

2. Means for holding uplifted the front end of a half-decked vehicle in a box car, which consists of V-shaped skeleton supports hung on the sides of the car so as to be horizontally adjustable and rotative in a vertical plane and engaging the front axle of the automobile, and braces for the supports, each having two members, one of which is pivoted to the support and having bearings and the other member being a screw slidably mounted in the first member, and means for locking the screw when the brace is in a bracing position.

In testimony whereof I hereunto affix my signature.

JOHN McMULLEN.